United States Patent Office 2,721,197
Patented Oct. 18, 1955

2,721,197

BICYCLIC LACTAMS

John Clark Sheehan, Arlington, Mass., assignor to Bristol Laboratories Inc., Syracuse, N. Y., a corporation of New York No Drawing. Application January 5, 1953,
Serial No. 329,732

16 Claims. (Cl. 260—239.1)

This invention relates to compounds having bacteriostatic, bacteriocidal and fungistatic properties and the methods of their preparation. Some of these compounds are useful in the synthesis of penicillin. More particularly, this invention relates to new methods for the preparation of compounds containing the basic fused β-lactam-thiazolidine rings present in the β-lactam structure for penicillin. The compounds of the present invention are also useful as chemical intermediates for transformation into amino- and substituted-amino-2-thiazolidine-acetic acid β-lactams having bacteriostatic properties and substituents as indicated. This transformation is effected by rupture of one or two bonds between the carbonyl atoms and the exocyclic nitrogen atom, followed, if desired, by acylation as with phenylacetic acid chloride. Compounds have been synthesized in which the combination of this ring system with an acylamino function alpha to the lactam carbonyl has been achieved for the first time. A striking feature of the present invention is that a compound has been prepared by a synthesis specifically designed to yield a β-lactam, which undergoes two typical and important penicillin reactions and possesses an infrared spectrum in the critical range almost identical to that of penicillin. This invention, therefore, constitutes the first chemical evidence from the synthetic side, for the β-lactam formulation of penicillin.

This application is a continuation-in-part of my prior, co-pending application of Serial No. 176,013, filed July 26, 1950 and now abandoned.

Very limited success has heretofore been attained in the synthesis of fused β-lactam-thiazolidine systems. The present invention represents a considerable advance in that this fused ring system in conjunction with the α-acylamine function has been attained, and for the first time such a synthetic structure has been shown to undergo chemical reactions typical to penicillin itself.

An extension of this reaction to the preparation of bicyclic β-lactams by the action of an acid chloride on a thiazoline (a cyclic imine) has resulted in the preparation of three fused β-lactams, all conforming to structure I.

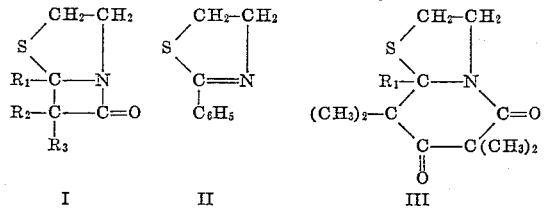

I   II   III

In only one case has a ketene been added directly to a thiazoline to form a β-lactam. Diphenyl ketene reacts with 2-phenyl-2-thiazoline (II) to give the β-lactam of 2,α,α,-triphenyl-2-thiazolidineactice acid (Ia, R₁=R₂=R₃=C₆H₅). Dimethyl ketene reacts with 2-methyl-2-thiazoline and 2-phenyl-2-thiazoline to give the corresponding piperidinediones (see III), which are convertible to the β-lactams by partial hydrolysis followed by pyrolysis.

A large number of attempts have been made to synthesize penicillin-like structures, including the attempted reaction of ketenes with a variety of thiazolines. Much effort has been expended in attempts to add ketene itself to thiazolines. Several attempts made by different investigators led to no crystalline product and no other evidence of β-lactam formation.

There is now discovered according to the present invention a compound of the general formula

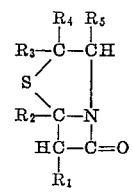

wherein $R_1$ represents cyclic diacylamino; $R_2$ represents a member selected from the group consisting of hydrogen and phenyl; $R_3$ and $R_4$ each represents a member selected from the group consisting of lower alkyl and hydrogen and $R_3$ and $R_4$ are alike; and $R_5$ represents a member selected from the group consisting of hydrogen, carboxy and (lower) carbalkoxy.

The important results to be described are summarized in the following equations and discussions.

Herein is disclosed the application of 5-phenyloxazolidine-2, 4-diones to the indirect synthesis of 6-phenylacetylamino-thiazolidine-β-lactam derivatives. Since acylaminoacid halides are not accessible in general, introduction of a 6-phenylacetylamino grouping into the β-lactam-thiazolidine nucleus by the acid chloride-thiazoline method may be indirect. One general approach to the problem involves the use of a protected amino acid chloride derivative (with no interfering NH group) from which an acylamino acid derivative can be formed under mild conditions. These acid chlorides represent systems which have been constituted by replacement of elements of the acylamino structure by certain labile units or "protecting groups." The requirements which such an acid chloride must meet in order to serve as a suitable reaction component are few but severe: (a) the protecting group must be stable to acids, since the preparation of the desired acid chloride must be carried out in an acidic medium; (b) the protecting group must be inert under the conditions of the acid chloride-thiazoline reaction; (c) the acid chloride must be sufficiently reactive to form the desired β-lactam; (d) after incorporation into the β-lactam-thiazolidine system the protecting groups must be readily removable to form the phenylacetylamino substituent under well-defined conditions which do not affect appreciably the penicillin-like structure.

The 5-phenyloxazolidine-2,4-dione ring system was chosen as a promising protecting group because, as illustrated below, it seemed possible that the phenylacetylamino group might be generated by hydrogenolytic cleavage of the benzyl lactone. The ring may in fact be considered as a carbobenzoxy group with a carbonyl bridge protecting the second amide hydrogen. This procedure has proved successful, and thus resolves one of the more serious shortcomings of the phthalimido and succinimido groups in the preparation of compounds closely related to benzylpenicillin.

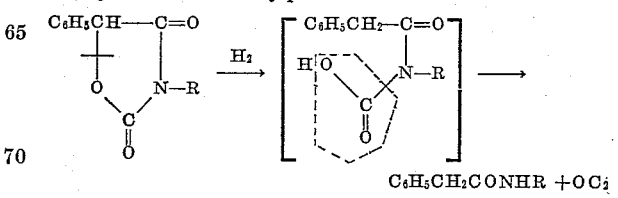

$C_6H_5CH_2CONHR + OC_i$

The starting material for the synthesis of the desired oxazolidinedione acid chloride (VI) was ethyl mandelate (I), prepared in 70% yield by Fisher esterification of mandelic acid. On condensation of the hydroxyester with urea in the presence of sodium ethoxide by a procedure patterned after the general method of Stoughton the sodium salt of the heterocycle (III) was obtained in 75% yield; acidification afforded II in 67.5% over-all yield. Attempted alkylation of III with potassium bromoacetate in dimethylformamide failed to yield a homogeneous product.

The problem at this point was to mask temporarily the carboxyl function of the haloacetate during alkylation of the heterocycle III, after which the masking function must be converted into an acid chloride without disturbing the sensitive oxazolidinedione ring. It would be difficult to remove a simple ester function (as, for example, methyl or ethyl) without hydrolyzing simultaneously the heterocyclic moiety. I have employed benzyl esters (removable with hydrogen over palladium) successfully in a similar synthesis of acyclic diacylamino acid chlorides, but hydrogenolysis conditions cleave 5-phenyloxazolidine-2,4-diones. It occurred to me that a masking group for the alkylation free of these objections might be a t-butyl ester, which is removable with anhydrous acids.

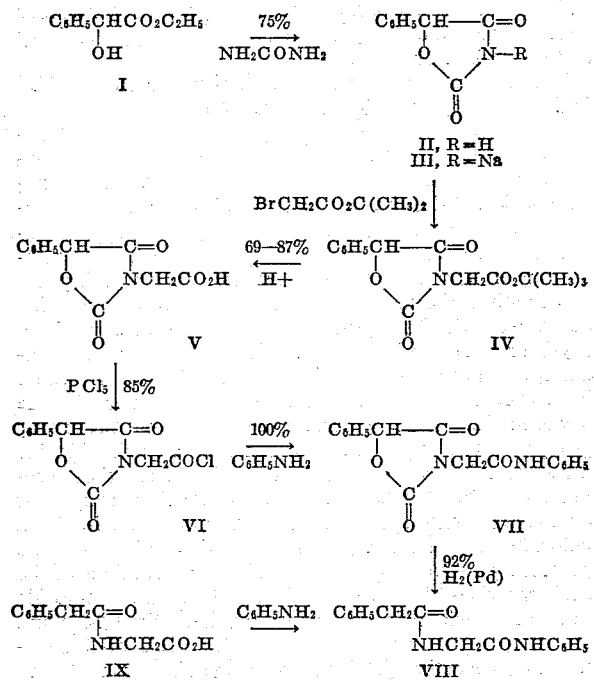

The ester IV was obtained readily by alkylation of II with t-butyl bromoacetate and sodium hydride, or better (100% yield) by reaction of III with this bromoester in dimethylformamide. The desired acid V could be prepared from the labile t-butyl ester by a variety of methods: pyrolysis for 30 minutes at 210° yielded 61% of V, solution of IV in concentrated sulfuric acid followed by dilution with water gave 87.3% of V, and treatment of IV with gaseous hydrogen chloride in dioxane lead to 69.2% of V. The facile cleavage of the t-butyl ester under anhydrous acid conditions is the key to success in this synthetic scheme.

The acid chloride VI was prepared in 85% yield using phosphorus pentachloride in benzene. The corresponding anilide VII was prepared in quantitative yield.

Studies of the cleavage of the heterocycle were carried out on the anilide VII. Hydrogenolysis with palladium-on-charcoal proceeded slowly at atmospheric pressure and room temperature to yield 91.5% of the expected phenaceturic acid anilide VIII, identified by comparison with an authentic sample prepared from phenaceturic acid (IX) and aniline. An alternate procedure using aluminum amalgam was also successful, although the yield was lower (42%). This is apparently the first example of the use of aluminum amalgam in the reductive cleavage of benzyl-type esters.

Other reagents known to be effective in reductive cleavages of benzyl esters, such as sodium in liquid ammonia and phosphonium iodide, were found to be ineffective in this case. The anilide decolorized the theoretical quantity of sodium in liquid ammonia but the product was a complex mixture suggestive of ammonolysis. These results are in accord with the well-known lability of the oxazolidinedione ring system to basic reagents. For example, 3,5,5-trimethyl-2,4-oxazolidinedione may be titrated to a phenolphthalein endpoint. N-methyl-2-hydroxy-2-methylpropionamide is one of the products isolated on acidification.

An acidic reagent, zinc-acetic acid-pyridine, reported to be very active in certain reductions, had no effect on the heterocyclic anilide VII.

The preparation of the thiazolidine-β-lactams studied is shown below.

The bicyclic lactam X was not obtained in pure state from the high dilution reaction of the acid chloride VI, triethylamine and 2-phenyl-2-thiazoline in refluxing ether, but similar reaction in methylene chloride yielded X in 28.4% yield. The sulfone XI was obtained by permanganate oxidation in 93.9% yield.

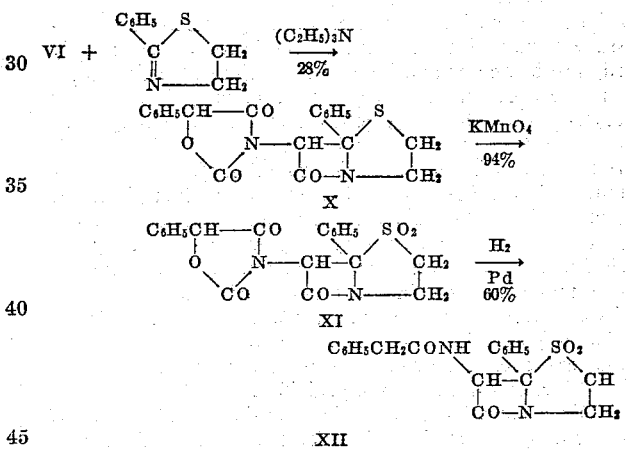

Hydrogenolysis of XI in the presence of palladium-on-charcoal catalyst at atmospheric pressure proceeded with considerable difficulty; the yield of cleaved product XII was 60%. The infrared spectrum of the phenylacetyl lactam (XII) shows the β-lactam band at 5.6μ and monosubstituted amide bands at 2.93, 5.93 and 6.60μ. Comparison of this spectrum with that of the heterocyclic sulfone XI shows that the heterocycle bands at 5.5 and 5.7μ disappear on hydrogenolysis.

An attempted hydrogenolysis of the unoxidized lactam X with palladium gave unchanged starting material as the only pure substance isolated. A similar reduction using aluminum amalgam also resulted in the recovery of the major portion of the original lactam.

EXAMPLE 1

*5-phenyl-2,4-oxazolidinedione (II)*

Ethyl mandelate, B. P. 112–118° at 3 mm., M. P. 30–31°, was prepared in 70% yield essentially as described by Fischer (Ber. 28, 3252).

To a solution of sodium ethoxide prepared from 13.8 g. (0.6 mole) of sodium and 200 ml. of absolute ethanol was added 36.0 g. (0.6 mole) of urea in one portion. To the stirred solution at 0° was added over a 10-minute period an ice-cold solution of the ester (108 g., 0.6 mole) in 100 ml. of absolute ethanol. The pasty mass was allowed to come to room temperature over a 20-minute period, then refluxed for 3.5 hours. Excess solvent (60 ml.) was removed by distillation and the resulting slurry stored at 5° for two hours. The sodium salt III, obtained in two crops, was washed with small portions of cold ethanol. The yield was 90.4 g. (75.4%).

A portion of the salt (15 g.) was dissolved in 100 ml. of water and 20 ml. of ether and the mixture acidified to pH 2 with 4 N hydrochloric acid. After separation of the oily layer and two extractions with 50 ml. portions of ether, the combined extracts were dried over magnesium sulfate. Concentration at 30 mm. and 50° yielded a crisp, yellow solid, which was recrystallized from 500 ml. of water as 11.9 g. (67.5% over-all) of colorless needles, M. P. 108.8–110.0°. The melting point reported by Traube and Ascher on a sample prepared by a different method was 108°.

EXAMPLE 2

*3-carbo-t-butoxymethyl-5-phenyl-2,4-oxazolidinedione (IV)*

To a solution of 77.6 g. (0.39 mole) of the sodium salt III in 200 ml. of dimethylformamide was added 76.0 g. (0.39 mole) of t-butyl bromoacetate with swirling over a 15 minute period. After storage overnight the dimethylformamide was removed by distillation at 70–80° and 15 mm. pressure. Toluene (100 ml.) was added, and the sodium bromide (41.0 g., 102%) collected by filtration. The concentrated filtrate amounted to 119.5 g. of viscous oil, or slightly more than the theoretical yield of IV. This compound was not analyzed because of its lability and difficulties in the purification procedures.

EXAMPLE 3

*3-carboxymethyl-5-phenyl-2,4-oxazolidinedione (V)*

CLEAVAGE OF IV WITH ANHYDROUS HYDROGEN CHLORIDE

A solution of a 111.5 g. portion of the oily ester IV in 300 ml. of anhydrous dioxane was saturated with hydrogen chloride gas at 0°. After storage overnight at room temperature the solution was concentrated to dryness and flushed with several small portions of toluene. Suspension of the residue in 100 ml. of toluene and filtration yielded 47.3 g. of V, M. P. 141.0–144.0°. A further quantity of acid was obtained by concentration of the toluene, solution of the residue in 200 ml. of dioxane and repetition of the hydrogen chloride treatment. After distillation of the dioxane, the residual oil was taken up in 300 ml. of ether, extracted with 500 ml. of water and concentrated to a soft solid. Trituration with several small portions of toluene followed by recrystallization from the same solvent yielded 11.8 g. of V, M. P. 138.8–145.0°. The over-all yield from III of combined product was 69.2%. An analytical sample from toluene melted at 144.8–145.2°.

*Analysis.*—Calculated for $C_{11}H_9O_5N$:

|   | Calculated | Found |
|---|---|---|
| C | 56.18 | 56.38 |
| H | 3.84 | 3.93 |
| N | 5.96 | 5.86 |

BY HYDROLYSIS OF IV WITH CONCENTRATED SULFURIC ACID

A solution of 1.20 g. portion of the ester IV was dissolved in 1.5 ml. of concentrated sulfuric acid, then diluted with 10 ml. of water with cooling. The white precipitate was collected by filtration after standing at 5° overnight yielding 0.800 g. (87.3%) of V, M. P. 142.0–144.0°. The product became discolored on long standing due to traces of residual sulfuric acid.

BY PYROLYSIS OF IV

A 1.20 g. portion of the ester in a small test-tube under a brisk stream of nitrogen was immersed in an oil-bath at 207° and maintained at the temperature for 30 minutes. The residue was triturated with 2 ml. of toluene and collected by filtration. After washing with small portions of toluene the tan solid weighed 0.556 g. (60.7%), M. P. 138.0–141.0°.

EXAMPLE 4

*Acid chloride of 3-carboxymethyl-5-phenyl-2,4-oxazolidinedione (VI)*

The acid V (23.6 g., 0.10 mole) and 21.0 g. (0.10 mole) of phosphorus pentachloride were mixed in a 100 ml. round-bottomed flask fitted with a condenser and calcium chloride tube. When fusion was almost complete 50 ml. of anhydrous benzene was added and the solution was refluxed for one hour. Concentration at 50° and 30 mm. pressure followed by distillation of several portions of toluene yielded crude VI as a readily crystallizing oil. Recrystallization from benzene-cyclohexane yielded 21.7 g. (85.3%) of pure acid chloride, M. P. 66.8–70.0°.

EXAMPLE 5

*3 - carboxanilidomethyl - 5-phenyl-2,4-oxazolidinedione (VII)*

To an ice cold solution of 2.54 g. (0.01 mole) of VI in 30 ml. of methylene chloride was added dropwise over a 30 minute period with stirring 1.82 ml. (1.86 g., 0.02 mole) of aniline in 10 ml. of methylene chloride. After being stirred one hour at room temperature, the mixture was concentrated to dryness under reduced pressure, extracted with two 25 ml. portions of water and filtered, yielding 3.10 g. (100%) of anilide, M. P. 166.0–166.5°. An analytical sample was obtained by recrystallization from methanol, M. P. 167.0–168.0°.

*Analysis.*—Calculated for $C_{17}H_{14}N_2O_4$:

|   | Calculated | Found |
|---|---|---|
| C | 65.80 | 65.68 |
| H | 4.91 | 4.87 |
| N | 9.03 | 8.79 |

EXAMPLE 6

*Phenaceturic acid anilide (VIII)*

A. BY HYDROGENOLYSIS OF VII WITH PALLADIUM-ON-CHARCOAL

A solution of 0.310 g. (0.00 mole) of VII in 10 ml. of dioxane containing 0.600 g. of 10% palladium-on-Darco charcoal catalyst was hydrogenated in a micro-hydrogenator under atmospheric pressure. A potassium hydroxide tube was incorporated into the system to absorb any carbon dioxide that might be given off. After nine hours the theoretical volume of hydrogen had been absorbed and hydrogen uptake ceased. The solution, from which the catalyst had been removed by filtration through Filter-Cel, was concentrated to a white powder. The yield of product, combined with the concentrated washings of the catalyst, amounted to 0.245 g. (91.5%) of VIII, M. P. 161–163.4°. The melting point of a mixture with an authentic sample was not depressed.

B. BY REDUCTION OF VII WITH ALUMINUM AMALGAM

Aluminum amalgam was prepared as follows: 1.8 g. of Chef Foil commercial sheet aluminum previously washed with acetone and buffed with emery paper was cut into small crumpled squares and washed with 10 ml. of 2.5% sodium hydroxide solution until brisk hydrogen evolution was observed. The residue was washed with five 15-ml. portions of water and then covered with 10 ml. of 1% mercuric chloride solution for 30 seconds. The residue was washed with two 10 ml. portions each of water, ethanol and ether in succession.

To the amalgam thus prepared was added 0.310 g. (0.001 mole) of anilide (VII) in 30 ml. of dioxane containing 0.5 ml. of water, which resulted in brisk evolution of hydrogen. Two further 0.5 ml. portions of water were added after two and six hours, respectively. After eight hours the solid residue was removed by filtration through Filter-Cel and the filtrate and washings concentrated at 50° and 30 mm. pressure. The residue (0.240 g.) was extracted with 10 ml. of warm 5% sodium hydroxide solution to remove unreacted starting material. The residue, M. P. 162.0–164.0°, amounted to 0.108 g. (42%). The melting point on admixture with an authentic sample of phenaceturic acid anilide was not depressed.

C. FROM PHENACETURIC ACID (IX)

Phenaceturic acid (0.50 g.) was refluxed in 5 ml. of aniline for five hours. The excess aniline was distilled directly and the residue taken up in 20 ml. of chloroform. After washing with 10 ml. of 5% sodium hydroxide and 5 ml. of 2.5 N hydrochloric acid the filtered chloroform solution was concentrated to an orange residue, which on trituration yielded 0.495 g. of anilide, M. P. 145–155°. Recrystallization from benzene, then dioxanecyclohexane yielded pure VIII, M. P. 162.5–163.5°.

EXAMPLE 7

2 - phenyl - α - (5-phenyl-2,4-diketo-3-oxazolidyl)-2-thiazolidineacetic acid β-lactam (X)

To a well-stirred, refluxing solution of 1.63 g. (0.01 mole) of 2-phenyl-2-thiazoline and 2.54 g. (0.01 mole) of the acid chloride VI in 35 ml. of methylene chloride was added through a high dilution cycle 1.41 ml. (1.02 g., 0.01 mole) of triethylamine in 50 ml. of methylene chloride. The time of addition was seven hours. The dark solution was concentrated to a brown magma, which yielded 1.26 g. of a colorless crystalline residue on trituration with acetone, or 91.3% as triethylamine hydrochloride.

The concentrated acetone solution crystallized spontaneously on standing overnight, and trituration and washing with two 15 ml. portions of 1:2 acetone-ethanol yielded 1.085 g. (28.4%) of lactam, M. P. 193.5–198.4°. A portion twice recrystallized from dioxane-petroleum ether (B. P. 30–60°) melted at 197.5–199.5°.

Analysis.—Calculated for $C_{20}H_{16}N_2O_4S$:

|   | Calculated | Found |
|---|---|---|
| C | 63.25 | 63.03 |
| H | 4.24 | 4.45 |
| N | 7.37 | 7.50 |

EXAMPLE 8

Sulfone of 2-phenyl-α-(5-phenyl-2,4-diketo-3-oxazolidyl)-2-thiazolidineacetic acid β-lactam (XI)

To a solution of 0.570 g. (0.0015 mole) of X in 50 ml. of dioxane was added 0.68 g. of potassium permanganate in 7 ml. of water and 20 ml. of glacial acetic acid. After 40 minutes the brown solution was decolorized with several drops of 30% hydrogen peroxide solution and diluted with 60 ml. of water. The colorless needles which separated at 0° were collected by filtration, yielding 0.580 g. (93.9%) of pure sulfone, M. P. 206.2° (dec.). A sample recrystallized from dioxanecyclohexane for analysis melted at 205.5° (dec.).

Analysis.—Calculated for $C_{20}H_{16}N_2O_6S$:

|   | Calculated | Found |
|---|---|---|
| C | 58.24 | 58.23 |
| H | 3.91 | 4.12 |
| N | 6.79 | 6.79 |

EXAMPLE 9

Sulfone of 2-phenyl-α-(phenylacetylamino)-2-thiazolidineacetic acid β-lactam (XII)

A solution of 0.925 g. (0.00225 mole) of XI in 50 ml. of dioxane was hydrogenated over 2.0 g. of 10% palladium-on-Darco catalyst in a Parr hydrogenator at 30° and atmospheric pressure for 73 hours with replacement of the catalyst after 50 hours. The catalyst was removed by filtration through Filter-Cel, and the concentrated filtrate caused to crystallize by trituration with benzene. The product 0.520 g. on recrystallization from chloroform-carbon tetrachloride amounted to 0.495 g. (60%), M. P. 140.5° (dec.). An analytical sample was obtained by recrystallization from chloroform-carbon tetrachloride, acetone-cyclohexane and finally dioxane-cyclohexane.

Analysis.—Calculated for $C_{19}H_{18}N_2O_4S$:

|   | Calculated | Found |
|---|---|---|
| C | 61.61 | 61.57 |
| H | 4.90 | 5.02 |
| N | 7.56 | 7.41 |

A small amount of material (0.135 g.) isolated from the original benzene triturate melted at 190.0° (dec.) after recrystallization from dioxane-cyclohexane; the melting point was not depressed on admixture with starting material.

Herein is also disclosed a second general method for the indirect introduction of the phenylacetylamino grouping on a β-lactam-thiazolidine nucleus, that is, the use of 2-benzylidene-4,5-diketo-3-oxazolidinecetyl chloride XIII in the synthesis of fused β-lactam-thiazolidines possessing a phenylacetylamino substituent. This is feasible, because XIII appeared to fulfill to large extent the stringent requirements outlined above. The acid chloride is a readily accessible, stable compound and its derivatives can be converted to phenylacetamides under relatively mild conditions.

The reaction of the acid chloride XIII with 2-phenyl-2-thiazoline and triethylamine was first studied. The transformations to be described are outlined in the accompanying equations. Addition of triethylamine under high-dilution conditions to a solution of XIII and the thiazoline in methylene chloride resulted in a 45% yield of the β-lactam XIV. The infrared spectrum of XIV is in complete accord with the β-lactam formulation. In addition to bands at 5.50, 5.73 and 5.95μ characteristics of the oxazolidinedione nucleus there appears a strong band at 5.62μ which is assignable to the β-lactam carbonyl. Treatment of the β-lactam XIV with two equivalents of benzylamine produced the desired phenylacetylaminolactam XV in 32% yield and the β-lactam derived from the alternative cleavage XVI in 21% yield. The infrared spectra of both XV and XVI exhibit bands near 5.6μ indicating that the β-lactam ring has not been ruptured. The lactam III is the first synthetic β-lactam thiazolidine which possesses a 6-phenylacetylamino substituent.

Oxidation of XV under carefully controlled conditions led to the sulfone XIX in 32% yield. The sulfone XIX is identical with the compound prepared by hydrogenolysis of the heterocyclic lactam XX. Samples prepared by the two routes had the same decomposition point and they possessed essentially identical infrared spectra and X-ray powder diffraction patterns. The infrared spectrum of XIX shows a band due to the β-lactam carbonyl at 5.56μ, whereas the unoxidized lactam exhibits a band at 5.67μ. A similar shift occurs in going from penicillin methyl ester to the corresponding sulfone. Since samples prepared by two routes are identical, the reaction of 2-phenyl-2-thiazoline with the acid chloride XII follows the same stereochemical course as the reaction with the acid chloride XXI.

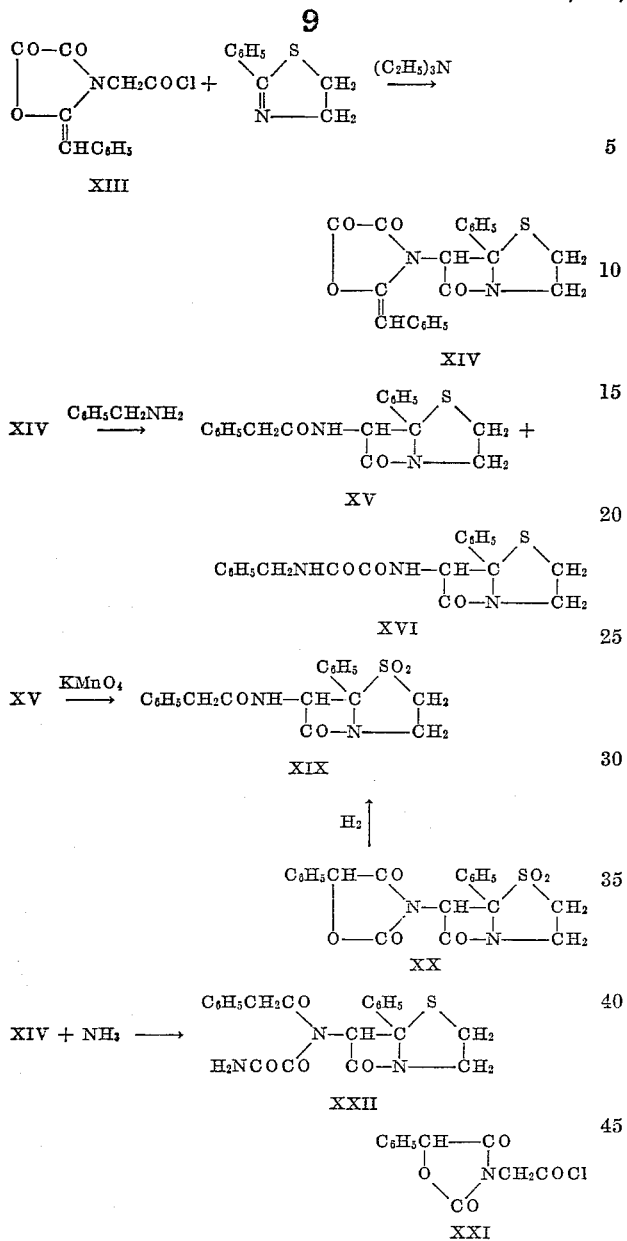

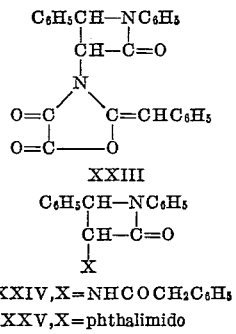

Treatment of XIV with excess ammonia under anhydrous conditions resulted in a 44% yield of XXII. The infrared spectrum of the ammonolysis product has a band at 5.63μ, indicating the presence of the β-lactam ring.

Reaction of the acid chloride XIII with benzalaniline and triethylamine yielded the β-lactam XXIII in 16% yield. The infrared spectrum of XXIII possesses sharp bands at 5.50 and 5.90μ characteristic of the oxazolidine-4,5-dione nucleus and a broad band with a center at 5.7μ, which, probably arises from both the β-lactam carbonyl and the oxazolidinedione nucleus. Although there is a possibility of forming two pairs of stereoisomeric lactams, only one could be isolated. The lactam XXIII reacts slowly and incompletely with two equivalents of benzylamine to yield only 15% of the theoretical N,N'-dibenzyloxamide along with a complex mixture of other products. This appears to be another example of the significant effect of the nitrogen substituent on the cleavage of oxazolidine-4,5-diones.

The same β-lactam XXIII can be prepared in low yield (17%) by the action of oxalyl chloride on 1,4-diphenyl-3-phenylacetylamino - 2 - azetidinone XXIV. The phthalimido-lactam XXV, which was prepared from phthaloylglycyl chloride and benzalaniline, was converted by hydrazinolysis to the free amino lactam XXVI, which in turn was phenylacetylated to give the desired product, XXIV.

XXIV, X=NHCOCH$_2$C$_6$H$_5$
XXV, X=phthalimido
XXVI, X=NH$_2$

The racemic β-lactams, XXIII, XXIV, and XXV are thus interrelated as members of the same stereochemical series, the reaction of benzalaniline proceeding stereochemically in the same direction with the acid chloride XIII as with phthaloylglycyl chloride. This evidence, together with that presented earlier, seems to indicate that the stereochemical course of the acid chloride-imine or -thiazoline reaction is not highly dependent upon the nature of the acid chloride.

EXAMPLE 10

2-phenyl-α-(2 - benzylidene-4,5-diketo-3-oxazolidyl)-2-thiazolidineacetic acid β-lactam XIV To 3.00 g. (0.01134 mole) of the acid chloride XIII dissolved in 20 ml. of dry dioxane in a 200 ml., three-necked flask was added 1.85 g. (0.01140 mole) of 2-phenyl-2-thiazoline in 20 ml. of methylene chloride (dried over Drierite). The solution was stirred and heated to rapid reflux in an atmosphere of nitrogen, while a solution of 1.15 g. (1.6 ml., 0.0114 mole) of triethylamine in 45 ml. of methylene chloride was added dropwise through a high-dilution cycle. The time required for the addition was 6.5 hours. The resulting dark solution was concentrated under reduced pressure to a volume of 10 ml., treated with 40 ml. of benzene and the mixture was filtered to remove the insoluble triethylammonium chloride, 1.425 g. (91%). Evaporation of the filtrate under reduced pressure yielded a sirup from which a crystalline solid soon separated. Trituration of the magma with a mixture of 20 ml. of methylene chloride and 5 ml. of benzene provided, after filtration and washing with two 5 ml. of portions of methylene chloride-benzene (4:1), 1.55 g. of a bright yellow solid, M. P. 186–187° (dec., in bath at 180°). After concentration of the filtrate to a volume of 5 ml., the oily residue was seeded with lactam and allowed to stand overnight. The resulting mixture was triturated with 100 ml. of acetone-water (65:35) and filtered. Further trituration of the insoluble solid with six 10-ml. portions of acetone-water (7:3) furnished an additional 0.425 g. of light yellow solid, M. P. 187–187.5° (dec., in bath at 184°). The total yield of XIV was 2.02 g. (44.5%). Recrystallization from methylene chloride-methylcyclohexane yielded the pure lactam, M. P. 189.2–190.4° (dec. in bath at 184°), as bright, yellow prisms.

Analysis.—Calculated for C$_{21}$H$_{16}$N$_2$O$_4$S:

|   | Calculated | Found |
|---|---|---|
| C | 64.27 | 64.32 |
| H | 4.11 | 4.18 |
| N | 7.14 | 7.31 |

Attempted oxidation of XIV to a sulfone using potassium permanganate in a buffered water-dioxane solution (pH 6.7) did not lead to any crystalline product. A qualitative test on XIV for sulfur was positive.

EXAMPLE 11

*Reaction of XIV with benzylamine*

To 0.150 g. (0.382 millimole) of pure XIV dissolved in 5 ml. of dry dioxane was added 0.90 ml. (0.863 millimole) of a solution of 1 ml. of benzylamine in 9 ml. of dioxane. The solution was allowed to stand for 17 hours at room temperature and then for two hours at 65°. Removal of the solvent under reduced pressure and trituration of the residue with petroleum ether afforded 0.215 g. of a light yellow powder. The crude mixture upon trituration with 6 ml. of acetone-benzene solution (5:1) and filtration furnished 0.051 g. (49.5%) of N,N'-dibenzyloxamide, M. P. 221–223°. To the filtrate was added 5 ml. of benzene and the resulting solution was concentrated to a volume of 6 ml. and cooled to 10°. The insoluble solid, M. P. 185–200° (dec.) (0.009 g.) was discarded and the solution was evaporated to dryness under reduced pressure. The residue was treated with 7 ml. of hot ethanol (95%) and the solution was filtered while hot. Upon cooling, 0.031 g. (21%) of a colorless solid, M. P. 173–174° (dec. in bath at 167°) separated. Recrystallization of this material from 7 ml. of ethanol and four drops of water gave 0.021 g. of pure XVI, M. P. 173.6–174.0 (dec., in bath at 169°), as fine, colorless needles.

*Analysis.*—Calculated for $C_{20}H_{19}N_3O_3S$:

|   | Calculated | Found |
|---|---|---|
| C | 62.97 | 62.96 |
| H | 5.02 | 5.23 |
| N | 11.02 | 11.00 |

The ethanol filtrate was evaporated to a volume of 2 ml. and treated slowly with 5 ml. of hot water. Upon cooling, a faintly yellow, oily solid was deposited which amounted to 0.081 g. Trituration of the solid with two 4-ml. portions of ether-petroleum ether (1:1) yielded 0.060 g. of a colorless powder, which was further purified by boiling with 7 ml. of carbon tetrachloride and removing the insoluble material, 0.0074 g., M. P. 160–170° (dec.), by filtration. The soluble material was recovered by evaporation of the filtrate to 1.5 ml. and addition of 4 ml. of hot ligroin. The resulting solid was recrystallized from 4 ml. of hot ethanol and 1 ml. of water to yield 0.041 g. (31.7%) of XV, M. P. 124.8–126.5°. Recrystallization from ethyl acetate-methylcyclohexame (Norit) led to 0.030 g. of pure lactam as fine needles, M. P. 126.0–126.5°.

*Analysis.*—Calculated for $C_{19}H_{18}N_2O_2S$:

|   | Calculated | Found |
|---|---|---|
| C | 67.40 | 67.66 |
| H | 5.36 | 5.49 |
| N | 8.28 | 8.57 |

EXAMPLE 12

*Sulfone of 2-phenyl-α-(phenylacetylamino)-2-thiazolidineacetic acid β-lactam XIX*

To 0.340 g. (0.100 millimole) of XV in 3 ml. of acetone was added 2 ml. of a solution made up from 0.8 g. of glacial acetic acid, 3.0 g. of sodium acetate trihydrate and 9 ml. of water. The resulting solution was cooled to 0° and 0.030 g. (0.195 millimole) of potassium permanganate dissolved in 4 ml. of acetone-water (1:1) was added dropwise over a period of five minutes. The reaction mixture was allowed to stand at 0° for 3.5 hours and at the end of this period was treated dropwise with 3% hydrogen peroxide until a clear, colorless, solution resulted. After diluting the solution with 2 ml. of water, the colorless, insoluble solid was collected by filtration. It amounted to 0.0050 g., M. P. 194.0–194.5° (dec., in bath at 187°).

The filtrate was treated with 5 ml. of water and concentrated in a stream of air until most of the acetone had been removed. The insoluble solid was collected by filtration, 0.0120 g. (32.4%), M. P. 140.0–140.5° (dec.) (reported 140.5°, dec.). Recrystallization from chloroform-carbontetrachloride furnished 0.010 g. of XIX as fine needles, M. P. 144.5–145° (dec.).

EXAMPLE 13

*Ammonolysis of XIV*

To a cold (0°) solution of 0.150 g. (0.382 millimole) of the lactam XIV in 5 ml. of dry dioxane and 5 ml. of ether was added 9.45 ml. of a 0.121 N solution of anhydrous ammonia in dioxane. The flask was tightly stoppered, and the reactants were allowed to stand at 0° for two hours and at room temperature for six days. The resulting pale yellow solution was evaporated under reduced pressure to an oil which, when triturated with 10 ml. of ether, afforded 0.101 g. of a light tan powder. Recrystallization of the crude material from 5 ml. of ethanol (Norit yielded 0.050 g. of colorless needles, M. P. 138.5–139.0° (dec.). An additional 0.018 g. of XXII was obtained from the mother liquors, M. P. 138.5–139.0° (dec.). An analytical sample which was prepared by recrystallization from ethanol-water had the same M. P.

*Analysis.*—Calculated for $C_{21}H_{19}N_3O_4S$:

|   | Calculated | Found |
|---|---|---|
| C | 61.60 | 61.69 |
| H | 4.68 | 4.89 |
| N | 10.26 | 10.39 |
| S | 7.83 | 7.75 |

EXAMPLE 14

*1,4-diphenyl-3-(2-benzylidene-4,5-diketo-3-oxazolidyl)-2-azetidinone XXIII*

A. To a well-stirred solution of 3.62 g. (0.020 mole) of benzalaniline and 1.01 g. (1.39 ml., 0.010 mole) of triethylamine in 50 ml. of dry methylene chloride was added dropwise a solution of 2.65 g. (0.010 mole) of the acid chloride XIII in 20 ml. of dioxane and 50 ml. of methylene chloride. The time required for the addition was one-half hour. The dark solution was concentrated to a volume of 30 ml. after addition of 40 ml. of dioxane and the insoluble triethylammonium chloride (1.14 g., 83%) was separated by filtration. The filtrate was evaporated under reduced pressure to a dark brown oil which was triturated with 100 ml. of anhydrous ether and dissolved in 15 ml. of chloroform. The chloroform solution was treated with 15 ml. of carbon tetrachloride and allowed to stand. After two hours there was obtained from the ether and chloroform-carbon tetrachloride solutions 1.12 g. and 0.150 g., respectively, of impure product. Recrystallization of the combined crude fractions from chloroform-carbon tetrachloride yielded 0.650 g. (15.85%) of the lactam XXIII as fine, yellow needles, M. P. 247–248°. A second recrystallization from the same solvent furnished analytically pure material, M. P. 248.0–249.3°.

*Analysis.*—Calculated for $C_{25}H_{18}N_2O_4$:

|   | Calculated | Found |
|---|---|---|
| C | 73.16 | 73.27 |
| H | 4.42 | 4.57 |
| N | 6.83 | 6.80 |

When treated with two equivalents of benzylamine the lactam XXIII reacted sluggishly, yielding a mixture from which only 15% of the theoretical amount of N,N'-dibenzyloxamide was isolated.

B. To a solution of 0.150 g. (0.423 millimole) of 1,4-diphenyl-3-phenylacetylamino-2-azetidinone in 10 ml. of dry dioxane was added 2 ml. of oxalyl chloride. After standing at room temperature for four hours, the solution was concentrated to an orange oil which was taken up on 25 ml. of methylene chloride, and washed with 20 ml. of 5% sodium bicarbonate solution. The clear, yellow solution was dried by filtration, evaporated to a volume of 5 ml., treated with 10 ml. of carbon tetrachloride and allowed to stand in a loosely stoppered flask for two days. The yellow precipitate (0.040 g.) which had appeared was collected by filtration and was recrystallized from methylene chloride-carbon tetrachloride. The yield of XXIII as fine, yellow needles was 0.030 g. (17.4%), M. P. 246–247° undepressed upon admixture with a sample prepared by method A.

Triethylamine is preferred but other basic tertiary amines may be used provided only that they be free of primary or secondary amines. Examples are tripropylamine, trimethylamine, pyridine, quinoline and N,N-dimethylaniline.

I claim:

1. A compound of the general formula

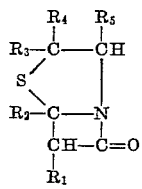

wherein $R_1$ represents a member selected from the group consisting of 2-benzylidene-4,5-diketo-3-oxazolidyl- and 5-phenyl-2,4-diketo-3-oxazolidyl-; $R_2$ represents a member selected from the group consisting of hydrogen and phenyl; $R_3$ and $R_4$ each represents a member selected from the group consisting of lower alkyl and hydrogen and $R_3$ and $R_4$ are alike; and $R_5$ represents a member selected from the group consisting of hydrogen, carboxy and (lower) carbalkoxy.

2. The compound

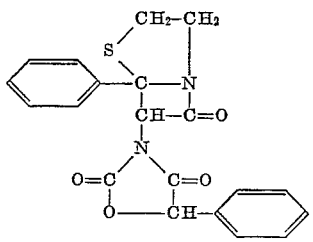

3. The compound

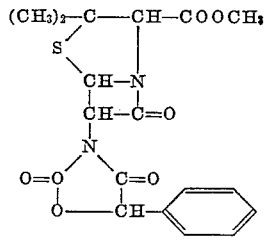

4. The compound

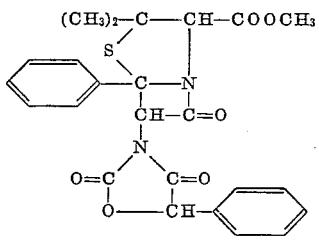

5. The compound

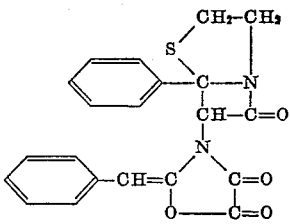

6. The compound

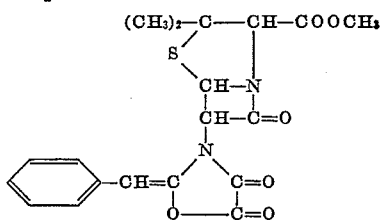

7. The compound

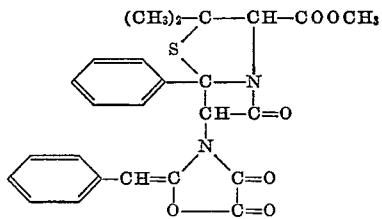

8. A process for the preparation of bicyclic β-lactams which comprises the interaction substantially in the range 0° C. to 100° C. of at least one molecular equivalent of a basic tertiary amine, bearing no functional groups, a cyclic chloride selected from the group consisting of (2-benzylidene-4,5-diketo-3-oxazolidine)-acetyl chloride and (5-phenyl-2,4-diketo-3-oxazolidyl)-acetyl chloride and a 2-thiazoline in an amount substantially equivalent to the amount of halide used on a molecular basis and having the formula

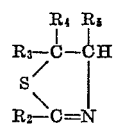

wherein $R_2$ represents a member selected from the group consisting of hydrogen and phenyl; $R_3$ and $R_4$ each represent a member selected from the group consisting of lower alkyl and hydrogen and $R_3$ and $R_4$ are alike; and $R_5$ represents a member selected from the group consisting of hydrogen, carboxy and (lower) carbalkoxy.

9. A process according to claim 8 where the 2-thiazoline is 2-phenyl-2-thiazoline.

10. A process according to claim 8 where the 2-thiazoline is methyl 5,5-dimethyl-2-phenyl-2-thiazoline-4-carboxylate.

11. A process according to claim 8 where the cyclic chloride is (2-benzylidene-4,5-diketo-3-oxazolidine)-acetyl chloride.

12. A process according to claim 8 where the cyclic chloride is (5-phenyl-2,4-diketo-3-oxazolidyl)-acetyl chloride.

13. A process according to claim 9 where the basic tertiary amine is triethylamine.

14. A process according to claim 10 where the basic tertiary amine is triethylamine.

15. A process according to claim 8 where the 2-thiazoline is methyl 5,5-dimethyl-2-thiazoline-4-carboxylate.

16. A process for the preparation of bicyclic β-lactams which comprises the interaction substantially in the range 0° C. to 100° C. of at least one molecular equivalent of a basic tertiary amine, bearing no functional groups, a cyclic chloride selected from the group consisting of (2- benzylidene-4,5-diketo-3-oxazolidine)-acetyl chloride and (5-phenyl-2,4-diketo-3-oxazolidyl)-acetyl chloride and a 2-thiazoline in an amount substantially equivalent to the amount of halide used on a molecular basis and having the formula

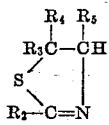

wherein $R_2$ represents a member selected from the group consisting of hydrogen and phenyl; $R_3$ and $R_4$ each represent a member selected from the group consisting of lower alkyl and hydrogen and $R_3$ and $R_4$ are alike; and $R_5$ represents a member selected from the group consisting of hydrogen, carboxy and (lower) carbalkoxy, said basic tertiary amine being added very slowly to the mixture of the other two reagents in an inert solvent.

References Cited in the file of this patent

UNITED STATES PATENTS 2,479,295     Behrens et al.   ---------- Aug. 16, 1949

OTHER REFERENCES

Behrens et al.: J. Biol. Chem., vol, 175, September 1948, pp. 783, 785.

Abbott Report CMR–A25, September 15, 1945, page 2.

Cutter Report CMR–Cu–7, July 1, 1945, pp. 1–5.

Lilly Report CMR–L–30, October 31, 1945, pp. 1–3.

Sheehan et al.: "J. Am. Chem. Soc.," vol. 72, August 1950, pp. 3828–9.

Sheehan et al.: "J. Am. Chem. Soc.," vol. 73, March 1951, pp. 1204–6.

Sheehan et al.: "J. Am. Chem. Soc.," vol. 73, October 1951, pp. 4752–9.